(12) United States Patent
Maekawa

(10) Patent No.: US 6,908,670 B1
(45) Date of Patent: Jun. 21, 2005

(54) LAMINATED EXTRUDED RESIN SHEET

(75) Inventor: Tomohiro Maekawa, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/161,283

(22) Filed: Sep. 28, 1998

(30) Foreign Application Priority Data

Oct. 2, 1997 (JP) .............................................. 9-270105

(51) Int. Cl.⁷ .............................. B32B 5/16; B32B 27/08
(52) U.S. Cl. ........................ 428/327; 428/515; 428/520
(58) Field of Search ................................ 428/323, 327, 428/500, 515, 502, 520, 522, 523

(56) References Cited

U.S. PATENT DOCUMENTS

| | | | | |
|---|---|---|---|---|
| 5,169,903 A | * | 12/1992 | Toritani et al. ............. | 525/310 |
| 5,216,096 A | * | 6/1993 | Hattori et al. .............. | 526/201 |
| 5,242,968 A | * | 9/1993 | Minghetti et al. .......... | 524/430 |
| 5,415,931 A | * | 5/1995 | Minghetti et al. .......... | 428/327 |
| 5,458,975 A | * | 10/1995 | Siol et al. .................... | 428/402 |
| 5,804,287 A | * | 9/1998 | Hatakeyama et al. ....... | 428/220 |
| 5,851,606 A | * | 12/1998 | Visser .......................... | 428/15 |
| 5,880,207 A | * | 3/1999 | Delphin et al. ............. | 524/523 |
| 6,147,162 A | * | 11/2000 | Tadokoro et al. ........... | 525/222 |
| 6,309,739 B1 | * | 10/2001 | Koizumi et al. ............ | 428/220 |
| 6,413,629 B1 | * | 7/2002 | Kimura ....................... | 428/343 |
| 6,444,298 B1 | * | 9/2002 | Tadokoro et al. ........... | 428/213 |

FOREIGN PATENT DOCUMENTS

| | | | |
|---|---|---|---|
| JP | 55034924 A | * | 3/1980 |
| JP | 4-18346 A | | 1/1992 |
| JP | 04059246 | * | 2/1992 |
| JP | 8-198976 | | 8/1996 |
| JP | 9-208789 A | | 8/1997 |

* cited by examiner

Primary Examiner—Deborah Jones
Assistant Examiner—Kevin R. Kruer
(74) Attorney, Agent, or Firm—Kendrew H. Colton; Fitch Even Tabin & Flannery

(57) ABSTRACT

The present invention provides a laminated extruded resin sheet comprising a methyl methacrylate resin produced by laminating resin layers (B) on both surfaces of a resin layer (A) by a multilayer-extrusion molding method, the resin layer (A) being made by dispersing uniformly 0 to 50 parts by weight of rubber-like polymer into 100 parts by weight of a methyl methacrylate resin, and the resin layer (B) being made by dispersing uniformly 1 to 50 parts by weight of an insoluble methyl methacrylate resin particle having a weight-average particles size of 1 to 100 um into 100 parts by weight of a base resin comprising 100 parts by weight of a methyl methacrylate resin and 0 to 70 parts by weight of rubber-like polymer. The laminated extruded resin sheet of the present invention provides a molder article having smaller bias of thickness in secondary thermoforming.

17 Claims, 1 Drawing Sheet

LAMINATED EXTRUDED RESIN SHEET

BACKGROUND OF THE INVENTION

1. Field of the Invention

Figure 1:
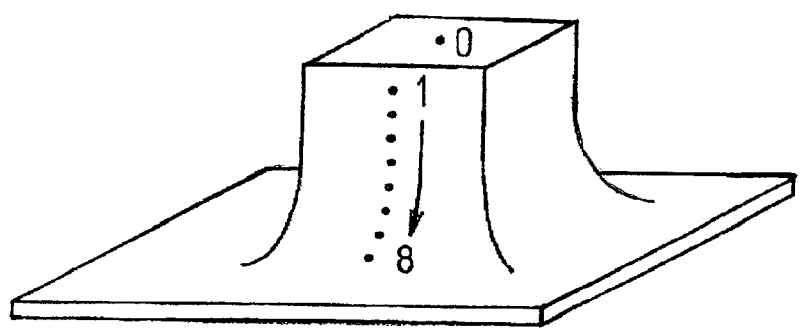

The present invention relates to a laminated extruded resin sheet comprising a methyl methacrylate resin, particularly, a laminated extruded resin sheet comprising a methyl methacrylate resin which is subjected to secondary thermoforming to obtain a formed article having smaller bias of thickness.

2. Description of the Related Art

A methyl methacrylate resin is a resin having excellent transparency and light resistance, and widely used in an optical material, lighting cover, illumination signboard and the like.

This methyl methacrylate resin is also excellent in secondary thermoforming property, and can be endowed with specific form by heating at temperature over heat deformation temperature and draw forming, after extruding once to form a sheet.

Examples of this secondary thermoforming method include free blow forming, free vacuum forming, pushing up forming, ridge forming, straight forming, drape forming, reverse draw forming, air slip forming, plug assist forming, plug assist reverse draw forming and the like, these forming methods are used alone or in combination to obtain desired form.

Recently, a lighting cover having corner portion extremely extruding and deep bath tub come to produce by super draw forming, and the forms of molded articles come increasingly further complicated by progress in forming technology itself.

High draw forming with short heating time or heating at low temperature also come to carry out as the development of the forming processing technology, therefore, resins to be formed are also required to be designed so as to cope with the severe conditions in this forming.

When the above-mentioned high draw forming is conducted using a conventional methyl methacrylate resin, there is a tendency that a sheet is broken in forming, or difference in thickness between high draw part and low draw part of a sheet remarkably increases even if forming is possible.

For solving these problems, there are disclosed an extruded sheet to which a fine particle having specific branched structures is added, and an extruded sheet obtained by allowing a methyl methacrylate polymer having specific cross-linked structure and a rubber-like polymer to be contained in a methyl methacrylate resin, for example, in Japanese Patent Application Laid-Open (JP-A) No. 9-208,789.

The extruded sheet described in JP-A 9-208789 is excellent, however, since it is liable to be contracted in effecting secondary thermoforming, there is a tendency that a uniform thin sheet is not easily obtained unless cooling condition is successfully controlled in producing an extruded sheet. Therefore, there is a problem that slight difference in forming property occurs between a sheet produced in summer and a sheet produced in winter in an extrusion production factory of which temperature control is difficult. Further, this sheet is expensive since effective ingredients are dispersed in the whole plate.

Then, the present inventors have intensively studied an extruded resin sheet comprising a methyl methacrylate resin which produced without specific conditioning in extrusion molding, and as a result, found that there is obtained a laminated extruded resin sheet comprising a methyl methacrylate resin which is produced without being influenced by cooling condition in producing an extruded sheet and can be subjected to secondary thermoforming to obtain a molded article having smaller bias of thickness, only by laminating thin layers of a methyl methacrylate resin in which a insoluble specific acrylic resin particle is dispersed onto both surfaces of a sheet of a methyl methacrylate resin in which the specific amount of a rubber-like polymer is dispersed, completing the present invention.

SUMMARY OF THE INVENTION

An object of the present invention is to provide a laminated extruded resin sheet comprising a methyl methacrylate resin which is produced without being influenced by cooling condition in producing an extruded sheet and can be subjected to secondary thermoforming to obtain a molded article having smaller bias of thickness.

That is, the present invention is a laminated extruded resin sheet comprising a methyl methacrylate resin produced by laminating resin layers (B) on both surfaces of a resin layer (A) by a multilayer-extrusion molding method, the resin layer (A) being made by dispersing uniformly 0 to 50 parts by weight of a rubber-like resin into 100 parts by weight of a methyl methacrylate resin, and the resin layer (B) being made by dispersing uniformly 1 to 50 parts by weight of a insoluble methyl methacrylate resin particle having a weight-average particle size of 0.1 to 100 $\mu$m based on 100 parts by weight of a base resin comprising 100 parts by weight of a methyl methacrylate resin and 0 to 70 parts by weight of a rubber-like polymer.

BRIEF DESCRIPTION OF THE INVENTION

FIG. 1 is an appearance view of the molded article obtained by forming the laminated extruded resin sheet in the example of the present invention.

The number of 0 to 8 represents measuring points for article thickness.

DETAILED DESCRIPTION OF THE INVENTION

The methyl methacrylate resin in the present invention is a resin comprising 50% by weight or more of a methyl methacrylate polymer, and may also be a copolymer comprising 50% by weight or more of a methyl methacrylate unit and a monofunctional unsaturated monomer unit as a constituent.

Examples of the monofunctional unsaturated monomer unit which is copolymerizable with methyl methacrylate are methacrylates such as ethyl methacrylate, butyl methacrylate, cyclohexyl methacrylate, phenyl methacrylate, benzyl methacrylate, 2-ethylhexyl methacrylate, 2-hydroxyethyl methacrylate and the like; acrylates such as methyl acrylate, ethyl acrylate, butyl acrylate, cyclohexyl acrylate, phenyl acrylate, benzyl acrylate, 2-ethylhexyl acrylate, 2-hydroxyethyl acrylate and the like; unsaturated acids such as methacrylic acid, acrylic acid and the like; styrene, $\alpha$-styrene, acrylonitrile, methacrylonitrile, maleic anhydride, phenylmaleimide, cyclohexylmaleimide, and the like.

Further, this copolymer may also contain a glutaric anhydride unit, glutarimide unit.

The rubber-like polymer in the present invention is an acrylic polymer having multilayer structure, or a graft copolymer obtained by graft-polymerizing 5 to 80 parts by weight of a rubber with 95 to 20 parts by weight of an ethylenically unsaturated monomer, particularly an acrylic unsaturated monomer, and the like.

The acrylic polymer having multilayer structure has 20 to 60 parts by weight of a layer of an elastomer as an inner component, and has a hard layer as an outermost layer, and may also further contain a hard layer as an innermost layer.

The layer of an elastomer means a layer of an acrylic polymer which has a glass transition temperature (Tg) of less than 25° C. and comprises a polymer obtained by cross-linking at least one monoethylenically unsaturated monomer such as a lower alkyl acrylate, lower alkyl methacrylate, lower alkoxy acrylate, cyanoethyl acrylate, acrylamide, hydroxy lower alkyl acrylate, hydroxy lower alkyl methacrylate, acrylic acid, methacrylic acid with a polyfunctional monomer.

The polyfunctional monomer means a monomer which can be copolymerized with the above-mentioned monoethylenically unsaturated monomers, and excludes conjugated dienes.

Examples of the polyfunctional monomer are alkyldiol di(meth)acrylates such as 1,4-butanediol di(meth)acrylate and neopentyl glycol di(meth)acrylate; alkylene glycol di(meth)acrylates such as ethylene glycol di(meth)acrylate, diethylene glycol di(meth)acrylate, tetraethylene glycol di(meth)acrylate, propylene glycol di(meth)acrylate and tetrapropylene glycol di(meth)acrylate; aromatic polyfunctional compounds such as divinylbenzene and diallyl phthalate; polyhydric alcohol (meth)acrylate of such as trimethylolpropane tri(meth)acrylate and pentaerythritol tetra(meth)acrylate, and allyl methacrylates, and the like.

These monomers may be used in combination of two or more.

The hard layer is a layer of an acrylic polymer which has Tg of 25° C. or more, and comprise a polymer of an alkyl methacrylate having an alkyl group having 1 to 4 carbon atoms or a copolymer of this alkyl methacrylate with a copolymerizable monofunctional monomer such as another alkyl methacrylate, alkyl acrylate, styrene, substituted styrene, acrylonitrile, methacrylonitrile and the like. It may also be a cross-linked polymer obtained by further adding a polyfunctional monomer and polymerizing them.

Examples of the acrylic polymer having multilayer structure are those described in Japanese Patent Application Publication (JP-B) No. 55-27,576, JP-A Nos. 6-80,739 and 49-23,292.

Examples of a rubber in the graft copolymer mentioned above are diene rubber such as polybutadiene rubber, acrylonitrile-butadiene copolymer rubber, styrene-butadiene copolymer rubber and the like, acrylic rubber such as polybutyl acrylate, polypropyl acrylate, poly-2-ethylhexyl acrylate and the like, and ethylene-propylene-non-conjugated diene rubber, and the like.

Examples of the ethylenic monomers used for graft-polymerizing this rubber are styrene, acrylonitrile, alkyl (meth)acrylate and the like.

As this graft copolymer, those described in JP-A No. 55-147,514 and JP-B No. 47-9,740 can be used.

The amount of the rubber-like polymer dispersed in the resin layer (A) is from 0 to 50 parts by weight, preferably from 3 to 20 parts by weight based on 100 parts by weight of the methyl methacrylate resin. When this amount is over 50 parts by weight, the Young's modulus in fluxure of a sheet lowers.

The amount of the rubber-like polymer dispersed in the resin layer (B) is from 0 to 70 parts by weight, preferably from 5 to 50 parts by weight based on 100 parts by weight of the methyl methacrylate resin. When this amount is over 70 parts by weight, the surface of a sheet plate is softened, and is easily scratched in forming processing.

The insoluble methyl methacrylate resin particle is a resin particle which is not dissolved into the methyl methacrylate resin in which the above-mentioned resin particle is dispersed, even in extrusion-molding and injection-molding. Example of this insoluble resin particle is a methyl methacrylate resin particle having high molecular weight or a cross-linked methyl methacrylate resin particle.

A resin particle having high molecular weight is obtained by polymerization of methyl methacrylate, or by co-polymerization of 50% by weight or more, preferably 80% by weight or more of methyl methacrylate and a monomer having one radical-polymerizable double bond in the molecule. This resin particle has a weight-average molecular weight (Mw) of 500,000 to 5,000,000.

Examples of the monomer having in the molecule one radical-polymerizable double bond are ethyl methacrylate, butyl methacrylate, cyclohexyl methacrylate, phenyl methacrylate, benzyl methacrylate, 2-ethylhexyl methacryalte, 2-hydroxyethyl methacrylate, methyl acrylate, ethyl acrylate, butyl acrylate, cyclohexyl acrylate, phenyl acrylate, benzyl acrylate, 2-ethylhexyl acrylate, 2-hydroxyethyl acrylate, methacrylic acid, acrylic acid, styrene, chlorostyrene, bromostyrene, vinyltoluene, α-methylstyrene and the like. These monomers may be used in combination of two or more.

A cross-linked resin particle is obtained by co-polymerization of monomers having in the molecule at least two double bonds with methyl methacrylate, or by co-polymerization of 50% by weight or more of methyl methacrylate, a monomer having in the molecule one radical-polymerizable double bond and a monomer having in the molecule at least two radical-polymerizable double bonds.

The monomer having in the molecule at least two radical-polymerizable double is copolymerizable with the above-mentioned monomers and excludes conjugated dienes, and the above-mentioned polyfunctional monomers are listed as examples.

This cross-linked resin particle has gel ratio of 10% or more which is measured by dissolving the particle in acetone.

The composition of the insoluble methyl methacrylate resin particle is allowable providing it is within the above-mentioned composition, and preferably, it is as near as possible the composition of the methyl methacrylate resin which is a base resin. Specifically, it is desirable that the difference of a ratio of the methyl methacrylate monomer unit constituting a base resin and a ratio of the methyl methacrylate monomer unit constituting the resin particle does not exceed 30%. When the difference is over 30%, the bias of thickness of the molded article in effecting secondary thermoforming may sometimes be not lowered.

The insoluble methyl methacrylate resin particle is obtained by polymerizing these constituent components by a method such as an emulsion polymerization method, dispersion polymerization method, suspension polymerization method, micro-suspension polymerization method and the like.

The particle size of the insoluble methyl methacrylate resin particle of the present invention is from 0.1 to 100 $\mu m$ in terms of weight-average particle size. When it is less than 0.1 μm, the bias of thickness of the molded article in secondary thermoforming is not lowered, and when over 100 μm, the impact resistance of a sheet is lowered.

The amount of the insoluble resin particle dispersed into the resin layer (B) is from 1 to 50 parts by weight, preferably from 3 to 20 parts by weight based on 100 parts by weight of a base resin comprising 100 parts by weight of a methyl methacrylate resin and 0 to 70 parts by weight of a rubber-like polymer. When it is less than 1 part by weight, the bias of thickness of the molded article is not lowered even if secondary thermoforming is conducted, and when over 50 parts by weight, the impact resistance of a sheet lowers.

The thickness of the laminated extruded resin sheet in the present invention is not particularly restricted, and preferably from 0.1 to 10 mm.

Regarding constitution of layers, it is necessary that the resin layers (B) cover the both surfaces of the resin layer (A). When only one surface is covered, the bias of thickness of the formed article is not lowered.

The layer thickness ratio [resin layer (B)/resin layer (A)/resin layer (B)] is approximately from 1/200/1 to 1/1/1, and preferably from 1/50/1 to 1/2/1. When the resin layer (B) is too thin, the bias of thickness of the molded article is not lowered, and on the other hand when the resin layer (A) is too thin, the dispersion amount itself of the insoluble particle increases and demerit occurs in cost though the bias of thickness of the molded article is lowered.

For preparing a composition in which the rubber-like polymer and insoluble resin particle are dispersed in the methyl methacrylate resin, public-known methods can be applied. Namely, there is a method in which these components are mechanically mixed by a Henschel mixer, tumbler mixer and the like, and melted and kneaded by a Banbury mixer or single screw or twin screw extruder. Further, it is also possible to make a laminated extruded resin sheet in one step using the multilayer-extrusion molding method described below.

For making laminated extruded resin sheet from the resulted composition, public-known multilayer-extrusion molding methods are used. The multilayer-extrusion molding method is a method in which compositions of the resin layer (A) and the resin layer (B) are melted and kneaded by two or three single or twin screw extruders, then, the compositions are laminated through a feed block die or multi manifold die, and a laminated melted resin sheet is cooled for solidification using a roll unit to obtain a laminated extruded resin sheet.

In the resin layer (A) and the resin layer (B), additives such as a light diffusing agent, dye, optical stabilizer, ultraviolet absorber, antioxidant, releasing agent, flame retardant, anti-electrostatic agent and the like are dispersed without specific problems in addition to the above-mentioned materials, and of course, they can be dispersed in combination of two or more.

The laminated extruded resin plate comprising a methyl methacrylate resin of the present invention provides a molded article having smaller bias of thickness in secondary thermoforming, and suitably used as materials for a lighting cover, bath tub, various toys and the like on which high drawing and complicated forming is performed.

EXAMPLES

The following examples further illustrate the present invention, but do not limit the scope thereof.

Extrusion apparatuses used in the examples are as follows.

Extruder ①: screw diameter 40 mm, single screw, with bent (manufactured by Tanabe Plastics Machinery Co., Ltd.)

Extruder ②: screw diameter 20 mm, single screw, with bent (manufactured by Tanabe Plastics Machinery Co., Ltd.

Feed block: two kinds three layer distribution (manufactured by Tanabe Plastics Machinery Co., Ltd.)

Die: T die, lip width 250 mm, lip distance 6 mm

Roll: Three polishing rolls, vertical type

The evaluation methods are as follows.

(1) Weight-average particle size

It was measured by a particle size analyzer (micro track particle size analyzer Model 9220 FRA, manufactured by Leeds & Northrup, Ltd.), and $D_{50}$, value was adopted as an average particle size.

(2) Confirmation of Thickness

The composition of the resin layer (B) was temporarily colored, the end surface of the resulted laminated extruded resin sheet produced by use of this colored composition was observed with a×15 magnifier and the thickness of the laminated part was confirmed.

(3) Thermoforming

A laminated extruded resin sheet of 30 cm×20 cm was heated from both sides by far infrared panel heaters so that the surface temperature rose up to 140° C. and 170° C., and a molded article as shown in FIG. 1 was obtained by using a pushing up forming machine (TF-300 type manufactured by Osaka Banki Seisakusho Co., Ltd., pushing up area; 10 cm×5 cm, pushing up height; 10 cm).

(4) Thickness Measurement

The thicknesses of a formed article at points "0", "1" to "8" shown in FIG. 1 were measured by a ultrasonic thickness measuring machine (ULTRASONIC GAGE MODEL 5222, manufactured by PANAMETRICS Ltd.).

"0" represents the center point of summit, and "1" to "8" represent points which are downwardly extended points by 1 cm respectively from the center summit of the side surface of a molded article.

Reference Example 1

[Production of Rubber-Like Polymer]

An acrylic polymer having three-layer structure was produced according to a method described in the example of JP-B No. 55-27,576.

Into a glass reaction vessel having an inner volume of 5 L was charged 1700 g of ion-exchanged water, 0.7 g of sodium carbonate and 0.3 g of sodium persulfate, and the mixture was stirred under nitrogen flow, and after 4.46 g of an emulsifier (Pellex OT-P, manufactured by Kao Corp.), 150 g of ion-exchanged water, 150 g of methyl methacrylate and 0.3 g of allyl methacrylate were charged, the mixture was heated up to 75° C. and stirred for 150 minutes.

Then, to this was added a mixture of 689 g of butyl acrylate, 162 g of styrene and 17 g of allyl methacrylate and a mixture of 0.85 g of sodium persulfate, 7.4 g of an emulsifier (Pellex OT-P, manufactured by Kao Corp.) and 50 g of ion-exchanged water via separate inlets over 90 minutes and the resulted mixture was further polymerized for 90 minutes.

After completing the polymerization, a mixture of 326 g of methyl acrylate and 14 g of ethyl acrylate and 30 g of ion-exchanged water into which 0.34 g of sodium persulfate had been dissolved were added via separate inlets over 30 minutes. After completing the addition, the mixture was kept for further 60 minutes to complete the polymerization.

The resulted latex was added into a 0.5% aqueous aluminum chloride solution to flocculate a polymer. This polymer was washed five times with hot water, and dried to obtain an acrylic polymer having three layer structure.

Reference Example 2
[Production of a Cross-Linked Methyl Methacrylate Resin Particle]

Into a glass reaction vessel having an inner volume of 2 L was charged 1200 g of ion-exchanged water, 0.4 g of sodium polymethacrylate (Mw=7,000,000, manufactured by Wako Pure Chemical Co., Ltd.), 1.2 g of polyoxyethylene polyoxypropylene ether (Pluronic F 68, manufactured by Asahi Denka Co., Ltd.) and 1.2 g of disodium hydrogen phosphate, then, a monomer mixture comprising of 380 g of methyl methacrylate, 17 g of methyl acrylate, 2 g of ethylene glycol dimethacrylate, 0.8 g of lauroyl peroxide and 1.5 g of n-dodecylmercaptan was charged.

With stirring at 800 rpm, 0.4 g of sodium polymethacrylate was continuously added at 75° C. for two hours while the polymerization ratio was within the range from 12 to 100%. After the polymerization, the mixture was washed, dehydrated, dried, then, classified by an air classifier (TC-15N, manufactured by Nisshin Engineering Co., Ltd.) to obtain a particle having a weight-average particle size of 33μ.

Examples 1 to 3
[Resin Layer (A)]

3 parts by weight of calcium carbonate (manufactured by Maruo Calcium Co., Ltd., average particle size 3μ) was mixed by a Henschel mixer with 100 parts by weight of a mixture obtained by mixing 100 parts by weight of a methyl methacrylate resin (Sumipex EXA, manufactured by Sumitomo Chemical Co., Ltd.) and the rubber-like polymer produced in Reference Example 1 in amount shown in Table 1, then, the mixture was melt and kneaded by the extruder ① and fed to a feed block.

[Resin Layer (B)]

The cross-linked methyl methacrylate resin particle produced in Reference Example 2 was mixed by a Henschel mixer in amount shown in Table 1 with 100 parts by weight of a mixture obtained by mixing the same methyl methacrylate resin as used in the resin layer (A) and the rubber-like polymer produced in Reference Example 1 in amounts shown in Table 1 respectively, then, the mixture was melt and kneaded by the extruder ② and fed to a feed block.

[Laminated Extruded Resin Sheet]

Multilayer-extrusion molding of three-layer constitution of 0.1 mm/1.8 mm/0.1 mm was conducted using the resin layer (A) as an intermediate layer and the resin layers (B) as surface layers at an extrusion resin temperature of 265° C., to produce a laminated extruded resin sheet having a width of 21 cm.

The evaluation results are shown in Table 2.

Example 4
[Resin Layer (A)]

3 parts by weight of calcium carbonate (manufactured by Maruo Calcium Co., Ltd., average particle size 3μ) was mixed by a Henschel mixer with 100 parts by weight of a mixture obtained by mixing 100 parts by weight of the same methyl methacrylate resin as used in Example 1 and the rubber-like polymer produced in Reference Example 1 in amount shown in Table 1, then, the mixture was melt and kneaded by the extruder ① and fed to a feed block.

[Resin layer (B)]

The cross-linked methyl methacrylate resin particle produced in Reference Example 2 was mixed by a Henschel mixer in amount shown in Table 1 with 100 parts by weight of a mixture obtained by mixing the same methyl methacrylate resin as used in the resin layer (A) and the rubber-like polymer produced in Reference Example 1 in amounts shown in Table 1 respectively, then, the mixture was melt and kneaded by the extruder ② and fed to a feed block.

[Laminated Extruded Resin Sheet]

Multilayer-extrusion molding of three-layer constitution of 0.2 mm/2.6 mm/0.2 mm was conducted using the resin layer (A) as an intermediate layer and the resin layers (B) as surface layers at an extrusion resin temperature of 265° C., to produce a laminated extruded resin sheet having a width of 21 cm.

The evaluation results are shown in Table 2.

Example 5
[Resin layer (A)]

1.6 parts by weight of calcium carbonate (manufactured by Maruo Calcium Co., Ltd., average particle size 3μ), 0.02 parts by weight of titanium oxide (manufactured by Ishihara Sangyo Co., Ltd.) and 0.5 parts by weight of a sodium alkyl sulfonate (having 15 to 16 carbon atoms, straight chain) were mixed by a Henschel mixer with 100 parts by weight of a mixture obtained by mixing 100 parts by weight of the same methyl methacrylate resin as used in Example 1 and the rubber-like polymer produced in Reference Example 1 in amount shown in Table 1, then, the mixture was melt and kneaded by the extruder ① and fed to a feed block.

[Resin layer (B)]

0.5 parts by weight of the same sodium alkyl sulfonate as used in the resin layer (A) was mixed by a Henschel mixer with 100 parts by weight of a mixture obtained by mixing the same methyl methacrylate resin as used in the resin layer (A) and the rubber-like polymer produced in Reference Example 1 in amounts shown in Table 1 respectively, then, the mixture was melt and kneaded by the extruder ① and fed to a feed block.

[Laminated Extruded Resin Sheet]

Multilayer-extrusion molding of three-layer constitution of 0.2 mm/2.6 mm/0.2 mm was conducted using the resin layer (A) as an intermediate layer and the resin layers (B) as surface layers at an extrusion resin temperature of 265° C., to produce a laminated extruded resin sheet having a width of 22 cm and a thickness of 3 mm.

The evaluation results are shown in Table 2.

Example 6
[Resin Layer (A)]

1.6 parts by weight of calcium carbonate (manufactured by Maruo Calcium Co., Ltd., average particle size 3μ) and 0.02 parts by weight of titanium oxide (manufactured by Ishihara Sangyo Co., Ltd.) were mixed by a Henschel mixer with 100 parts by weight of a mixture obtained by mixing 100 parts by weight of the same methyl methacrylate resin as used in Example 1 and the rubber-like polymer produced in Reference Example 1 in amount shown in Table 1, then, the mixture was melt and kneaded by the extruder ① and fed to a feed block.

[Resin Layer (B)]

0.5 parts by weight of a sodium alkyl sulfonate (having 15 to 16 carbon atoms, straight chain) was mixed by a Henschel mixer with 100 parts by weight of a mixture obtained by mixing the same methyl methacrylate resin as used in the resin layer (A), the rubber-like polymer produced in Reference Example 1 and the cross-linked methyl methacrylate resin particle produced in Reference Example 2 in amounts shown in Table 1 respectively, then, the mixture was melt and kneaded by the extruder ② and fed to a feed block.

[Laminated Extruded Resin Sheet]

Multilayer-extrusion molding of three-layer constitution of 0.1 mm/1.8 mm/0.1 mm was conducted using the resin layer (A) as an intermediate layer and the resin layers (B) as surface layers at an extrusion resin temperature of 265° C., to produce a laminated extruded resin sheet having a width of 21 cm and a thickness of 2 mm.

The evaluation results are shown in Table 2.

Comparative Example 1

The same procedure as in Example 4 was conducted except that one flow route of the resin layer (B) was stopped by feed block operation for two-layer extrusion forming in Example 4. A laminated extruded resin sheet having a width of 20 cm was produced in which the resin layer (B)/the resin layer (A) was 0.2 mm/2.8 mm.

The evaluation results are shown in Table 2.

Comparative Example 2

The same procedure as in Example 4 was conducted except that the materials for resin layer (A) and the resin layer (B) were exchanged in Example 4, to produce a laminated extruded resin sheet.

The evaluation results are shown in Table 2.

Comparative Example 3

25 parts by weight of the same rubber-like polymer produced in Reference Example 1 was mixed by a Henschel mixer with 100 parts by weight of the same methyl methacrylate resin as used in Example 1, then, the mixture was melt and kneaded by the extruder ① and a single-layer extruded resin sheet having a width of 20 cm and a thickness of 3 mm was produced at an extrusion resin temperature of 265° C.

The evaluation results are shown in Table 2.

Comparative Example 4

13 parts by weight of the particle produced in Reference Example 2 was mixed by a Henschel mixer with 100 parts by weight of a mixture of 100 parts by weight of the same methyl methacrylate resin as used in Example 1 and 25 parts by weight of the rubber-like polymer produced in Reference Example 1, then, the mixture was melt and kneaded by the extruder ① and a single-layer extruded resin sheet having a width of 20 cm and a thickness of 3 mm was produced at an extrusion resin temperature of 265° C.

The evaluation results are shown in Table 2.

TABLE 1

| | | Resin layer (A) | | Resin layer (B) | | |
|---|---|---|---|---|---|---|
| | | Resin | | Resin | | Particle |
| | Layer constitution mm | PMMA (parts) | Rubber-like polymer (parts) | PMMA (parts) | Rubber-like polymer (parts) | Amount of dispersion (parts) |
| Example 1 | 0.1/1.8/0.1 | 100 | 10 | 100 | 14 | 9 |
| Example 2 | 0.1/1.8/0.1 | 100 | 14 | 100 | 39 | 7 |
| Example 3 | 0.1/1.8/0.1 | 100 | 14 | 100 | 39 | 11 |
| Example 4 | 0.2/2.6/0.2 | 100 | 25 | 100 | 0 | 13 |
| Example 5 | 0.2/2.6/0.2 | 100 | 0 | 100 | 42 | 5 |
| Example 6 | 0.1/1.8/0.1 | 100 | 4 | 100 | 45 | 11 |
| Comparative example 1 | 0.2/2.8 | 100 | 25 | 100 | 0 | 13 |

PMMA : methyl methacrylate resin
parts : parts by weight

TABLE 2

| | | Molding temperature ° C. | Points for measuring article thickness | | | | | | | | | Maximum difference mm |
|---|---|---|---|---|---|---|---|---|---|---|---|---|
| | | | 0 mm | 1 mm | 2 mm | 3 mm | 4 mm | 5 mm | 6 mm | 7 mm | 8 mm | |
| Example | 1 | 140 | 1.502 | 1.547 | 1.288 | 1.408 | 1.535 | 1.671 | 1.795 | 1.922 | 2.002 | 0.714 |
| | 2 | 140 | 1.577 | 1.615 | 1.286 | 1.344 | 1.469 | 1.625 | 1.77 | 1.918 | 2.047 | 0.761 |
| | 3 | 140 | 1.585 | 1.644 | 1.329 | 1.428 | 1.544 | 1.689 | 1.828 | 1.948 | 1.991 | 0.662 |
| | 4 | 170 | 2.199 | 1.216 | 1.13 | 1.247 | 1.487 | 1.584 | 1.727 | 1.87 | 1.903 | 1.069 |
| | 5 | 170 | 1.703 | 1.591 | 1.054 | 1.187 | 1.324 | 1.433 | 1.530 | 1.650 | 1.740 | 0.649 |
| | 6 | 170 | 1.414 | 0.765 | 0.651 | 0.689 | 0.775 | 0.888 | 0.989 | 1.122 | 1.223 | 0.763 |
| Comparative example | 1 | 170 | 3.055 | 1.007 | 0.993 | 1.122 | 1.288 | 1.47 | 1.613 | 1.771 | 1.885 | 2.048 |
| | 2 | 170 | 2.719 | 1.103 | 1.116 | 1.214 | 1.353 | 1.477 | 1.629 | 1.76 | 1.774 | 1.616 |
| | 3 | 170 | 2.959 | 0.966 | 1.01 | 1.129 | 1.288 | 1.461 | 1.62 | 1.757 | 1.835 | 1.993 |
| | 4 | 170 | 2.272 | 1.167 | 1.022 | 1.155 | 1.33 | 1.53 | 1.725 | 1.915 | 2.022 | |

What is claimed is:

1. A laminated extruded resin sheet comprising a methyl methacrylate resin produced by laminating resin layers (B) on both surfaces of a resin layer (A) by a multilayer-extrusion molding method,
the resin layer (A) (i) consisting of a methyl methacrylate resin, (ii) consisting of a methyl methacrylate resin and additive wherein said additive is selected from the group consisting of a light diffusing agent, a dye, optical stabilizer, ultraviolet absorber, antioxidant, releasing agent, flame retardant agent anti-electrostatic agent, gad combinations thereof, or (iii) consisting of a methyl methacrylate resin and from 3 to 50 parts by weight of a rubber-containing polymer uniformly dispersed in 100 parts by weight of the methyl methacrylate resin, and optionally said additive, and the resin layer (B) being made by dispersing uniformly 1 to 50 parts by weight of insoluble methyl methacrylate resin particles having a weight-average particle size of 1.0 to 33 μm based on 100 parts by weight of a base resin comprising a methyl methacrylate resin, said insoluble methyl methacrylate resin particles comprising 50% or more by weight of methyl methacrylate, and wherein the insoluble methyl methacrylate particles are obtained by a one-stage polymerization of a monomer composition containing 50% by weight or more methyl methacrylate.

2. The laminated extruded resin sheet comprising a methyl methacrylate resin according to claim 1, wherein the methyl methacrylate resins in the layer (A) and the layer (B) are resin containing 50% by weight or more of a methyl methacrylate polymer or a copolymer comprising 50% by weight of more of methyl methacrylate unit and a monofunctional unsaturated monomer unit as a constituent unit.

3. The laminated extruded resin sheet comprising a methyl methacrylate resin according to claim 1, wherein the difference in percentage of methyl methacrylate monomer unit constituting the base resin and the percentage of methyl methacrylate monomer unit constituting the resin particle does not exceed 30%.

4. The laminated extruded resin sheet comprising a methyl methacrylate resin according to claim 1, wherein the layer thickness ratio of (resin layer (B)/resin layer (A)/resin layer (B)) is from 1/200/1 to 1/1/1.

5. The laminated extruded resin sheet according to claim 1, wherein the resin layer (B) contains an ultraviolet absorber.

6. The laminated extruded resin sheet according to claim 1, wherein the resin layer (A) contains a light diffusing agent.

7. The laminated extruded resin sheet comprising a methyl methacrylate resin according to claim 1, wherein the insoluble methyl methacrylate resin particle is a methyl methacrylate resin particle having a weight-average molecular weight of 500,000 to 5,000,000 or a cross-linked methyl methacrylate resin particle.

8. The laminated extruded resin sheet comprising a methyl methacrylate resin according to claim 1, wherein the methyl methacrylate resin in at least one of layer (A) and the layer (B) is a resin containing 50% by weight or more of a methyl methacrylate polymer or a copolymer comprising 50% by weight or more of methyl methacrylate unit and a monofunctional unsaturated monomer unit as a constituent unit.

9. The laminated extruded resin sheet according to claim 1, wherein the base resin comprises 100 parts by weight of a methyl methacrylate resin and 5 to 70 parts by weight of a rubber-containing polymer.

10. The laminated extruded resin sheet according to claim 1, wherein the base resin comprises 100 parts by weight of a methyl methacrylate resin and 5 to 50 parts by weight of a rubber-containing polymer.

11. The laminated extruded resin sheet according to claim 1, wherein the resin layer (A) consists of 100 parts by weight of a methyl methacrylate resin, from 3 to 50 parts by weight of a rubber-containing polymer uniformly dispersed into the 100 parts by weight of a methyl methacrylate resin, and, optionally and the base resin comprises 100 parts by weight of a methyl methacrylate resin and 5 to 70 parts by weight of a rubber-containing polymer.

12. The laminated extruded resin sheet according to claim 1, wherein the =in layer (A) of 100 parts by weight of methyl methacrylate resin, from 3 to 20 parts by weight of a rubber-containing polymer uniformly dispersed into the 100 parts by weight of a methyl methacrylate resin, and, optionally said additive; and the base resin comprises 100 parts by weight of a methyl methacrylate resin and 5 to 50 parts by weight of a rubber-containing polymer.

13. The laminated extruded resin sheet according to claim 9, 10, 11 or 12, wherein the rubber-containing polymer is a graft copolymer obtained by graft-polymerizing 5 to 80 parts by weight of rubber with 95 to 20 parts by weight of an ethylenically unsaturated monomer.

14. A laminated extruded resin sheet comprising a methyl methacrylate resin produced by laminating resin layers (B) on both surfaces of a resin layer (A) by a multilayer-extrusion molding method, the resin layer (A) (i) consisting of a methyl methacrylate resin, (ii) consisting of a methyl methacrylate resin ard additive wherein said additive is selected from the group consisting a light diffusing agent, a dye, optical stabilizer ultraviolet absorber, antioxidant, releasing agent, flame retardant agent, anti-electrostatic agent, and combinations thereof, or (iii) consisting of a methyl methacrylate resin, from 3 to 50 parts by weight of a rubber-containing polymer uniformly dispersed in the methyl methacrylate resin, and, optionally said additive, and the resin (B) being made by dispersing uniformly 1 to 50 parts by weight of insoluble methyl methacrylate resin particles having a weight-average particle size of 1.0 to 33 μm base on 100 parts by weight of a base resin comprising a methyl methacrylate resin, wherein a layer thickness ratio of resin layer (B)/resin layer (A)/resin layer (B) is from 1/200/1 to 1/1/1, and wherein the base resin comprises 100 parts by weight of a methyl methacrylate resin and 5 to 70 parts by weight of a rubber containing polymer, said insoluble methyl methacrylate resin particles comprising 50% or more by weight of methyl methacrylate and are obtained by one-stage polymerization of a monomer composition containing 50% by weight of more of a methyl methacrylate.

15. The laminated extruded resin sheet according to claim 14, wherein the resin layer (A) consists of methyl methacrylate resin and 3 to 50 parts by weight of a rubber-containing polymer uniformly dispersed in 100 parts by weight of the methyl methacrylate resin.

16. The laminated extruded resin sheet according to claim 14, wherein the resin layer (A) consists of 100 parts by weight of a methyl methacrylate resin, 3 to 20 parts by weight of a rubber-containing polymer uniformly dispersed in the 100 parts by weight of a methyl methacrylate resin, and, optionally, said additive the base resin comprises 100 parts by weight of a methyl methacrylate resin and 5 to 50 parts by weight of a rubber-containing, polymer.

17. The laminated extruded resin sheet comprising a methyl methacrylate resin according to claim 14, when the insoluble methyl methacrylate resin particles are methyl methacrylate resin particles having a weight-average molecular weight of 500,000 to 5,000,000 or cross-linked methyl methacrylate resin particles.

* * * * *